W. A. HUBBARD.
HAND BRAKE ATTACHMENT.
APPLICATION FILED SEPT. 17, 1915.
1,187,322.
Patented June 13, 1916.
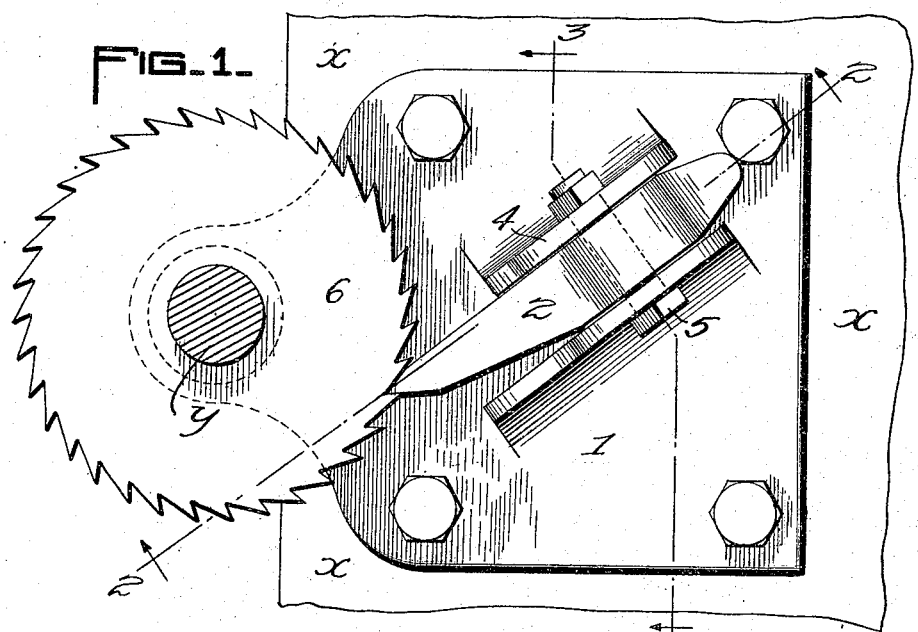
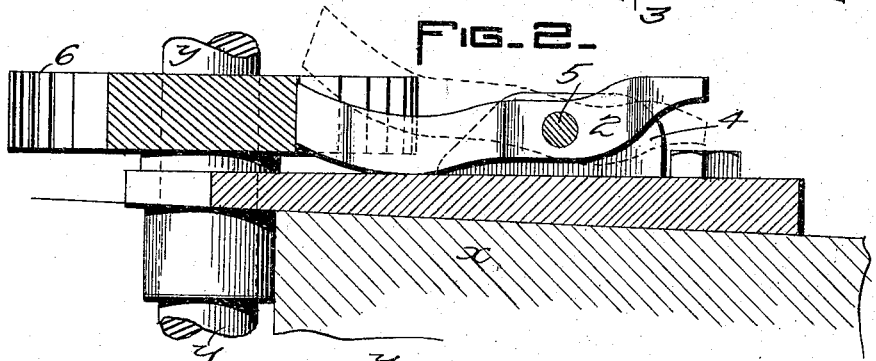
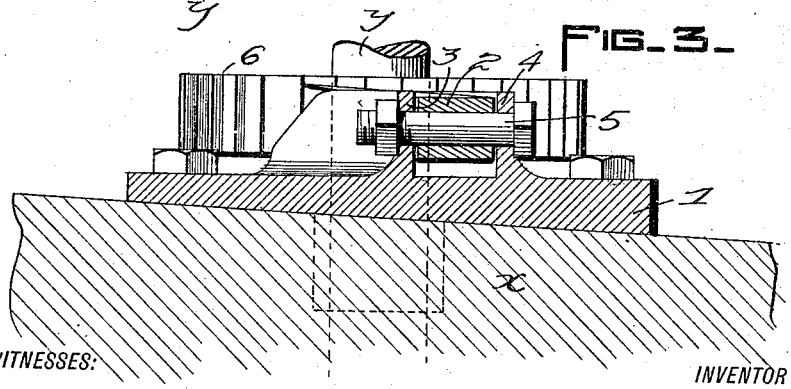
WITNESSES:
J. V. Phillips
N. E. Beck
INVENTOR
WILLIAM A. HUBBARD,
BY Munn & Co.
ATTORNEYS

UNITED STATES PATENT OFFICE.

WILLIAM A. HUBBARD, OF HOQUIAM, WASHINGTON.

HAND-BRAKE ATTACHMENT.

1,187,322.  Specification of Letters Patent.  Patented June 13, 1916.

Application filed September 17, 1915. Serial No. 51,250.

*To all whom it may concern:*

Be it known that I, WILLIAM A. HUBBARD, a citizen of the United States, and a resident of Hoquiam, in the county of Grays Harbor and State of Washington, have made an Improvement in Hand-Brake Attachments, of which the following is a specification.

My invention is embodied particularly in an improved ratchet-and-pawl attachment of a brake rod or staff for railway cars, whereby greater rigidity and strength also security are obtained.

The details of construction, arrangement, and operation are as hereinafter described, and illustrated in the accompanying drawing, in which:—

Figure 1 is a plan view of the invention. Fig. 2 is a horizontal section on the line 2—2 of Fig. 1. Fig. 3 is a horizontal section on the line 3—3 of Fig. 1.

$x$ indicates the top or roof and adjacent end of a freight car, and $y$ indicates a portion of a brake rod or staff which is arranged vertically in the usual way. This staff has its bearing in the projecting narrowed end of a metal plate 1, which is bolted in a horizontal position to the roof of the car $x$. As will be seen in Figs. 2 and 3, the plate is tapered to compensate for the inclination of the car roof, so that its upper side is horizontal.

A gravity pawl 2 is pivoted between two parallel vertical lugs, or flanges, 3 and 4, which are cast integrally with the plate 1. The pawl is pivoted on a bolt 5 passing through coincident holes in the lugs, and the pivotal point is nearer the outer end of the pawl so that the heavier inner end rests normally upon the plate 1, as shown in Fig. 2.

The outer and shorter arm of the pawl is raised from the plate, as shown in Fig. 2. The inner point of the pawl engages a ratchet disk 6, which is keyed on the brake-rod or staff $y$ and whose periphery is constructed with radial teeth. It is apparent that, by pressure upon the shorter raised arm of the pawl, its inner heavier end may be raised out of engagement with the ratchet, as indicated by dotted lines, Fig. 2. The construction and arrangement of the pawl as described insure its normal engagement with the ratchet and prevent disengagement by jars and jolts of the car in running. It will also be noted that the pawl and lugs being practically in the same horizontal plane with the ratchet disk, they occupy minimum space in that plane.

It will be observed—see Fig. 1—that the lug 3 is longer and therefore stronger than the lug 4, this construction being adopted for the reason that the lug 3 sustains more weight and pressure than the other. The strength and rigidity of the plate and its lugs, and the security of the pawl against accidental displacement, and the economy of construction of the attachment as a whole render it superior in operation and use.

I claim:—

1. In a hand-brake attachment the combination of a base plate having parallel vertical perforated lugs, a weighted pawl pivoted between said lugs, a vertical brake staff or rod and a disk ratchet keyed thereon horizontally and having its periphery constructed with radial teeth, the pawl being arranged to swing vertically or in a plane at right angles to the ratchet whereby it is adapted to engage the ratchet when its inner end rests on the base plate and to be disengaged therefrom when its outer shorter arm rests on the base plate, as described.

2. A hand-brake attachment comprising a horizontal base plate having a bearing for the brake rod or staff and provided with vertical lugs spaced apart, a ratchet disk keyed on the staff and having radial peripheral teeth, a transverse bolt passing through the lug, a gravity pawl pivoted on said bolt and lying practically in the same plane with the ratchet, the inner longer arm of the pawl resting normally on the base plate as and for the purpose specified.

WILLIAM A. HUBBARD.

Witnesses:
L. H. BREWER,
M. M. KUENEKE.

Copies of this patent may be obtained for five cents each, by addressing the "Commissioner of Patents Washington, D. C."